United States Patent
Matsuura et al.

(10) Patent No.: US 10,982,074 B2
(45) Date of Patent: Apr. 20, 2021

(54) NATURAL RUBBER, RUBBER COMPOSITION AND PNEUMATIC TIRE

(71) Applicant: SUMITOMO RUBBER INDUSTRIES, LTD., Kobe (JP)

(72) Inventors: Ai Matsuura, Kobe (JP); Lucksanaporn Tarachiwin, Rayong (TH); Kamalin Kanyawararak, Rayong (TH); Hathainat Kum-Ourm, Rayong (TH); Masatoshi Kobayashi, Kobe (JP); Takehiro Kitaura, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 413 days.

(21) Appl. No.: 16/093,567

(22) PCT Filed: Apr. 26, 2017

(86) PCT No.: PCT/JP2017/016559
§ 371 (c)(1),
(2) Date: Oct. 12, 2018

(87) PCT Pub. No.: WO2017/195604
PCT Pub. Date: Nov. 16, 2017

(65) Prior Publication Data
US 2020/0377695 A1 Dec. 3, 2020

(30) Foreign Application Priority Data
May 11, 2016 (JP) .............................. JP2016-095485

(51) Int. Cl.
*C08L 7/00* (2006.01)
*B60C 1/00* (2006.01)

(52) U.S. Cl.
CPC .................. *C08L 7/00* (2013.01); *B60C 1/00* (2013.01); *C08L 2205/025* (2013.01); *C08L 2205/03* (2013.01)

(58) Field of Classification Search
None
See application file for complete search history.

(56) References Cited

U.S. PATENT DOCUMENTS

2005/0148723 A1  7/2005  Kondou
2011/0184118 A1*  7/2011  Sugimoto ............... C08L 15/00
                                                            524/547

(Continued)

FOREIGN PATENT DOCUMENTS

EP  2 390 088 A2  11/2011
JP  6-329838 A    11/1994
(Continued)

OTHER PUBLICATIONS

Machine Translation of JP-2000-336102-A, dated Dec. 5, 2000, with Japanese original attached.

(Continued)

*Primary Examiner* — Robert S Loewe
(74) *Attorney, Agent, or Firm* — Birch, Stewart, Kolasch & Birch, LLP

(57) ABSTRACT

The invention provides natural rubbers having improved processability and/or abrasion resistance, rubber compositions containing the natural rubbers, and pneumatic tires formed from the rubber compositions. The invention relates to a natural rubber which shows a $^1$H-NMR spectrum where the sum of peak intensities at about 4.17, 3.94, 3.84, 3.73, 3.50, and 3.41 ppm, normalized to 10,000 for the peak intensity at about 5.11 ppm, is 8.0 or less.

6 Claims, 1 Drawing Sheet

(56) References Cited

U.S. PATENT DOCUMENTS

| | | | |
|---|---|---|---|
| 2011/0253285 A1* | 10/2011 | Ichikawa | ............. C08L 15/00 152/564 |
| 2013/0030083 A1 | 1/2013 | Taguchi et al. | |
| 2014/0005319 A1 | 1/2014 | Ichikawa | |
| 2016/0297947 A1 | 10/2016 | Sakaki et al. | |

FOREIGN PATENT DOCUMENTS

| | | |
|---|---|---|
| JP | 2000-336102 A | 12/2000 |
| JP | 2003-24653 A | 1/2003 |
| JP | 2004-262973 A | 9/2004 |
| JP | 2005-15585 A | 1/2005 |
| JP | 2006-213750 A | 8/2006 |
| JP | 2007-126562 A | 5/2007 |
| JP | 2015-155522 A | 8/2015 |
| WO | WO 03/082925 A1 | 10/2003 |
| WO | WO 2015/098419 A1 | 7/2015 |

OTHER PUBLICATIONS

Machine Translation of JP-2003-24653-A, dated Jan. 28, 2003, with Japanese original attached.
Machine Translation of JP-2005-15585-A, dated Jan. 20, 2005, with Japanese original attached.
Machine Translation of JP-2007-126562-A, dated May 24, 2007, with Japanese original attached.
Machine Translation of JP-6-329838-A, dated Nov. 29, 1994, with Japanese original attached.
International Search Report for PCT/JP2017/016559 (PCT/ISA/210) dated May 30, 2017.
Written Opinion of the International Searching Authority for PCT/JP2017/016559 (PCT/ISA/237) dated May 30, 2017.

* cited by examiner

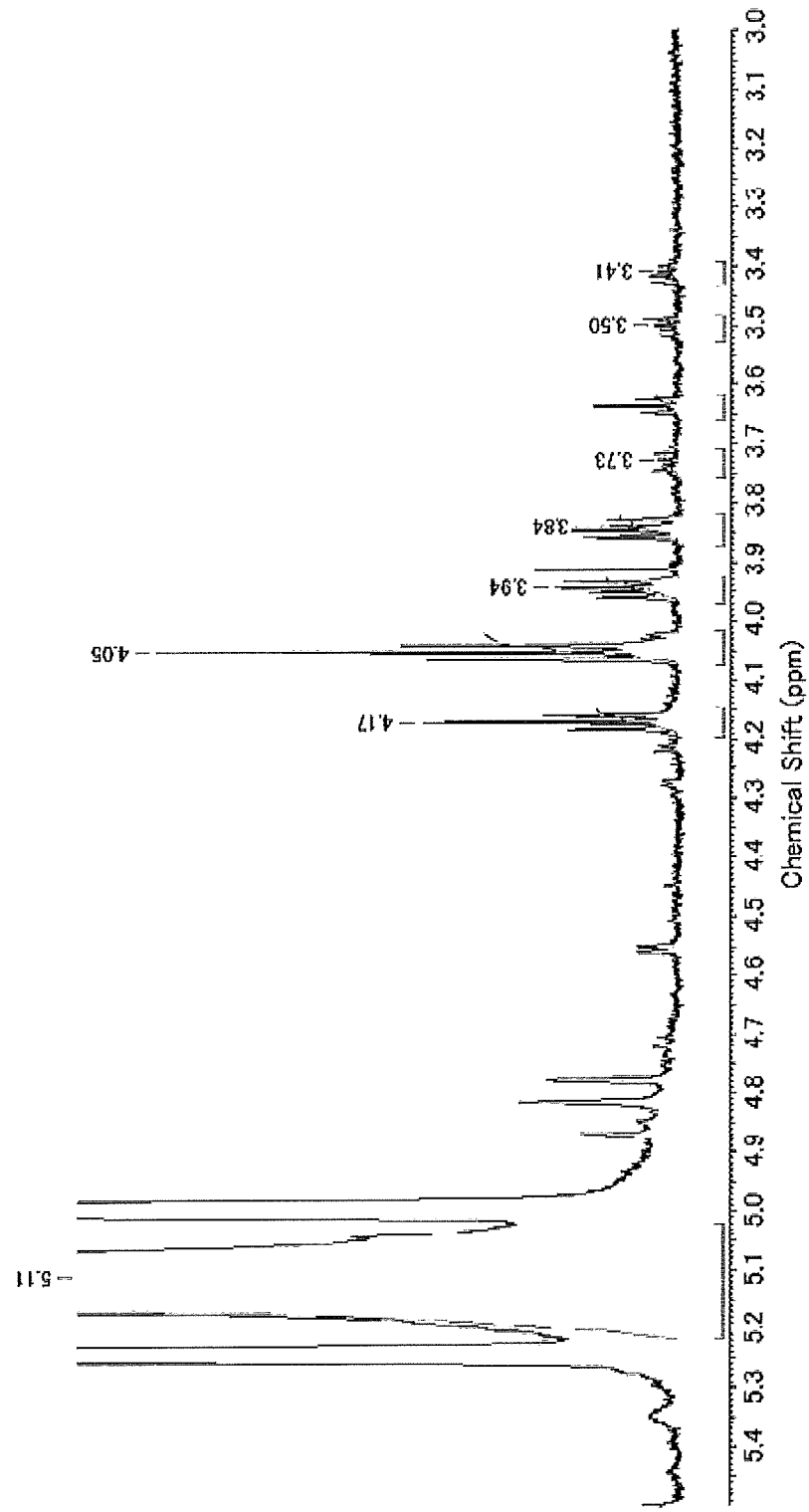

NATURAL RUBBER, RUBBER COMPOSITION AND PNEUMATIC TIRE

TECHNICAL FIELD

The invention relates to natural rubbers, rubber compositions containing the natural rubbers, and pneumatic tires formed from the rubber compositions.

BACKGROUND ART

Natural rubbers, which contain non-rubber components such as proteins and lipids, have a high toluene-insoluble gel content. In general, such high gel content natural rubbers disadvantageously have poor processability because they have a high Mooney viscosity and it is difficult to disperse compounding agents including fillers such as carbon or silica uniformly in such natural rubbers during kneading.

Moreover, since the service life of rubber products such as tires has been extended in recent years, it is desirable to further improve abrasion resistance of natural rubbers.

Thus, there is a need to develop natural rubbers having improved processability and/or abrasion resistance.

SUMMARY OF INVENTION

Technical Problem

The invention aims to solve the problem and provide natural rubbers having improved processability and/or abrasion resistance, rubber compositions containing the natural rubbers, and pneumatic tires formed from the rubber compositions.

Solution to Problem

A first aspect of the invention relates to a natural rubber, which shows a $^1$H-NMR spectrum where a sum of peak intensities at about 4.17, 3.94, 3.84, 3.73, 3.50, and 3.41 ppm, normalized to 10,000 for a peak intensity at about 5.11 ppm, is 8.0 or less.

A second aspect of the invention relates to a natural rubber, which shows a $^1$H-NMR spectrum where a ratio of a sum of peak intensities at about 3.94 and 3.84 ppm to a sum of peak intensities at about 4.17, 3.94, 3.84, 3.73, 3.50, and 3.41 ppm is 45% or more.

A third aspect of the invention relates to a natural rubber, having a ratio of an amount of a structural unit represented by the following formula (c) to a combined amount of structural units represented by the following formulas (a) to (d) of 45 mol % or more:

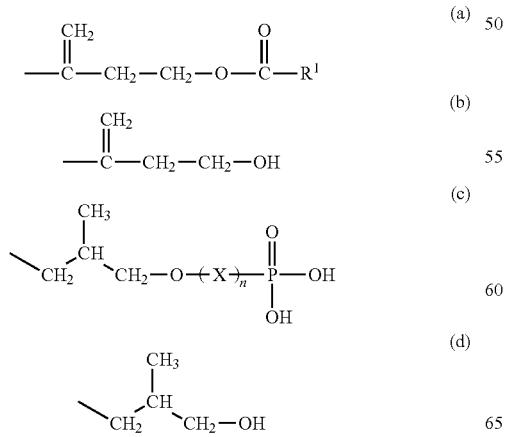

wherein $R^1$ represents a branched or unbranched C1-C30 alkyl group or a branched or unbranched C2-C30 alkenyl group; and n represents 0 or 1, and X represents a divalent group.

The natural rubbers preferably have a weight average molecular weight of $6.0 \times 10^5$ or greater.

The invention also relates to a rubber composition, containing, based on 100% by mass of a rubber component therein, 10% by mass or more of any of the natural rubbers.

The invention also relates to a pneumatic tire, formed from the rubber composition.

ADVANTAGEOUS EFFECTS OF INVENTION

The specific natural rubbers according to the invention have improved processability and/or abrasion resistance.

BRIEF DESCRIPTION OF DRAWINGS

FIG. 1 is an example of the spectrum of a natural rubber determined by $^1$H-NMR.

DESCRIPTION OF EMBODIMENTS

[Natural Rubber]

A first aspect of the invention relates to a natural rubber which shows a $^1$H-NMR spectrum where the sum of peak intensities at about 4.17, 3.94, 3.84, 3.73, 3.50, and 3.41 ppm, normalized to 10,000 for the peak intensity at about 5.11 ppm, is 8.0 or less.

A second aspect of the invention relates to a natural rubber which shows a $^1$H-NMR spectrum where the ratio of the sum of peak intensities at about 3.94 and 3.84 ppm to the sum of peak intensities at about 4.17, 3.94, 3.84, 3.73, 3.50, and 3.41 ppm is 45% or more.

A third aspect of the invention relates to a natural rubber having a ratio of the amount of a structural unit of formula (c) to the combined amount of structural units of formulas (a) to (d) of 45 mol % or more.

Natural rubber molecules have two chain ends, one of which is an α-end adjacent to cis units and the other end is an ω-end adjacent to trans units. The exact structure of the α-end has not been identified by previous studies.

The present inventors analyzed the structure of the α-end and found that there are four structural units represented by the following formulas (a) to (d) for the α-end of natural rubber molecules:

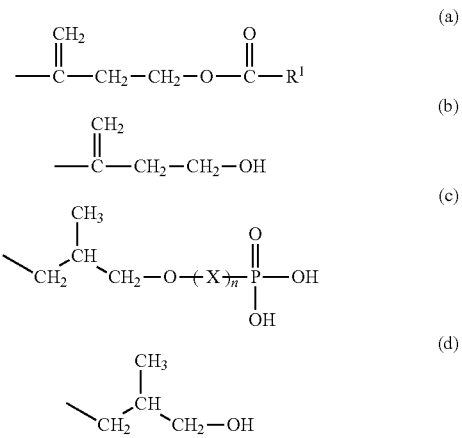

wherein $R^1$ represents a branched or unbranched C1-C30 alkyl group or a branched or unbranched C2-C30 alkenyl group; and n represents 0 or 1, and X represents a divalent group.

The hydrogen atoms in the structural units of formulas (a) to (d) have respective specific peaks in the spectra of natural rubbers determined by $^1$H-NMR (see, for example, FIG. 1). Thus, the intensities (areas) of these peaks may be used to determine the relative amounts of the structural units.

Specifically, in the spectra, the peaks at about 4.17 ppm correspond to the hydrogen atoms indicated by the arrow in the structural unit represented by the following formula (a), the peaks at about 3.73 ppm correspond to the hydrogen atoms indicated by the arrow in the structural unit represented by the following formula (b), the peaks at about 3.94 and 3.84 ppm correspond to the hydrogen atoms indicated by the arrow in the structural unit represented by the following formula (c), and the peaks at about 3.50 and 3.41 ppm correspond to the hydrogen atoms indicated by the arrow in the structural unit represented by the following formula (d). Moreover, the peaks at about 5.11 ppm correspond to the hydrogen atoms in the double bond portions of the backbone of natural rubber molecules.

Herein, the $^1$H-NMR analysis means the NMR analysis described later in EXAMPLES.

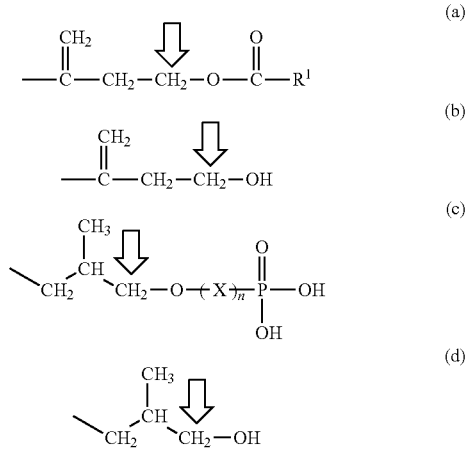

In formula (a), $R^1$ represents a branched or unbranched C1-C30 alkyl group or a branched or unbranched C2-C30 alkenyl group. In formula (c), n represents 0 or 1, and X represents a divalent group.

The present inventors have made extensive studies and have found that a natural rubber has improved abrasion resistance which shows a $^1$H-NMR spectrum where the sum of peak intensities at about 4.17, 3.94, 3.84, 3.73, 3.50, and 3.41 ppm, normalized to 10,000 for the peak intensity at about 5.11 ppm, is 8.0 or less. This finding has led to the completion of the first aspect of the invention.

Also, the present inventors have made extensive studies and have found that a natural rubber has improved processability which has a ratio of the amount of a structural unit of formula (c) to the combined amount of structural units of formulas (a) to (d) of 45 mol % or more, i.e. shows a $^1$H-NMR spectrum where the ratio of the sum of peak intensities at about 3.94 and 3.84 ppm to the sum of peak intensities at about 4.17, 3.94, 3.84, 3.73, 3.50, and 3.41 ppm is 45% or more. This finding has led to the completion of the second and third aspects of the invention.

The natural rubber according to the first aspect of the invention shows a $^1$H-NMR spectrum where the sum of peak intensities at about 4.17, 3.94, 3.84, 3.73, 3.50, and 3.41 ppm, normalized to 10,000 for the peak intensity at about 5.11 ppm, is 8.0 or less, preferably 7.8 or less. If the sum is more than 8.0, abrasion resistance may be reduced. Moreover, the lower limit of the sum may be, but not limited to, 2.0 or more, 4.0 or more, or 6.0 or more.

The natural rubbers according to the second and third aspects of the invention may also have the above-described properties. Such natural rubbers have both improved abrasion resistance and processability.

The natural rubber according to the second aspect of the invention shows a $^1$H-NMR spectrum where the ratio of the sum of peak intensities at about 3.94 and 3.84 ppm to the sum of peak intensities at about 4.17, 3.94, 3.84, 3.73, 3.50, and 3.41 ppm is 45% or more, preferably 47% or more, more preferably 50% or more. If the ratio is less than 45%, processability may be reduced. Moreover, the upper limit of the ratio may be, but not limited to, 100%, or 80% or less, or 60% or less.

The natural rubber according to the first aspect of the invention may also have the above-described properties. Such a natural rubber has both improved abrasion resistance and processability.

The natural rubber according to the third aspect of the invention has a ratio of the amount of a structural unit represented by the following formula (c) to the combined amount of structural units represented by the following formulas (a) to (d) of 45 mol % or more, preferably 47 mol % or more, more preferably 50 mol % or more. If the ratio is less than 45 mol %, processability may be reduced. Moreover, the upper limit of the ratio may be, but not limited to, 100 mol %, or 80 mol % or less, or 60 mol % or less.

The natural rubber according to the first aspect of the invention may also have the above-described properties. Such a natural rubber has both improved abrasion resistance and processability.

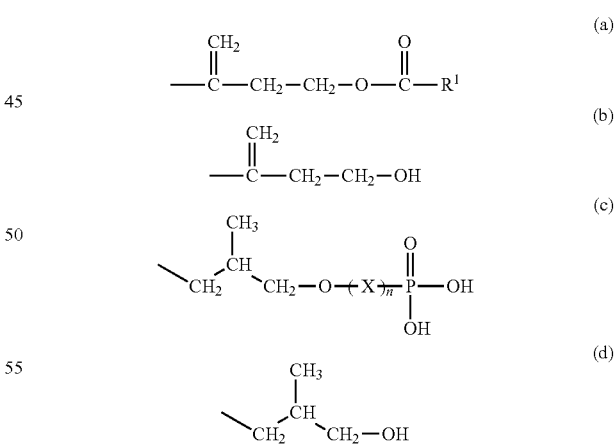

In formula (a), $R^1$ represents a branched or unbranched C1-C30 alkyl group or a branched or unbranched C2-C30 alkenyl group. In formula (c), n represents 0 or 1, and X represents a divalent group.

Examples of the branched or unbranched C1-C30, preferably C8-C22, more preferably C12-C20, alkyl group for $R^1$ in formula (a) include methyl, ethyl, n-propyl, isopropyl, n-butyl, sec-butyl, tert-butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and icosyl groups.

Examples of the branched or unbranched C2-C30, preferably C8-C22, more preferably C12-C20, alkenyl group for $R^1$ in formula (a) include vinyl, 1-propenyl, 2-propenyl, 1-butenyl, 2-butenyl, 3-butenyl, pentenyl, hexenyl, octenyl, nonenyl, decenyl, undecenyl, dodecenyl, tridecenyl, tetradecenyl, pentadecenyl, hexadecenyl, heptadecenyl, octadecenyl, nonadecenyl, and icocenyl groups.

Non-limiting examples of the divalent group for X in formula (c) include branched or unbranched C1-C30 alkylene groups, amino groups, and groups represented by $—S_n—$ in which n represents 1 to 8.

Examples of the branched or unbranched C1-C30, preferably C1-C20, more preferably C1-C10, alkylene groups for formula (c) include methylene, ethylene, n-propylene, isopropylene, butylene, pentylene, hexylene, heptylene, octylene, nonylene, decylene, undecylene, dodecylene, tridecylene, tetradecylene, pentadecylene, hexadecylene, heptadecylene, octadecylene, nonadecylene, and icosylene groups.

The natural rubbers of the invention preferably have a weight average molecular weight (Mw) of $6.0 \times 10^5$ or greater, more preferably $9.0 \times 10^5$ or greater, still more preferably $1.2 \times 10^6$ or greater, particularly preferably $1.4 \times 10^6$ or greater. When the Mw is less than $6.0 \times 10^5$, abrasion resistance may be reduced. Moreover, the upper limit of the Mw is preferably, but not limited to, $2.0 \times 10^6$ or less, more preferably $1.8 \times 10^6$ or less, still more preferably $1.6 \times 10^6$ or less.

Herein, the Mw is determined as described later in EXAMPLES.

The natural rubbers of the invention may be prepared by, for example, a method that includes: centrifuging a natural rubber latex to obtain two or more natural rubber latexes with different natural rubber particle sizes; mixing the two or more natural rubber latexes in an appropriate ratio; and coagulating the natural rubber latex mixture.

Natural rubber latexes, which contain natural rubber particles of different sizes, may be subjected to a gradually increasing centrifugal force to gradually separate the natural rubber particles, from larger to smaller size.

The present inventors have made extensive studies and have found that larger size natural rubber particles are relatively rich in natural rubber molecules containing the structural unit of formula (c), while smaller size natural rubber particles are relatively rich in natural rubber molecules in which the sum of peak intensities at about 4.17, 3.94, 3.84, 3.73, 3.50, and 3.41 ppm is small.

Accordingly, the natural rubber according to the first aspect of the invention may be prepared, for example, by increasing the mixing ratio of a natural rubber latex containing smaller size natural rubber particles. Moreover, the natural rubbers according to the second and third aspects of the invention may be prepared, for example, by increasing the mixing ratio of a natural rubber latex containing larger size natural rubber particles.

Examples of natural rubber latexes that can be used include raw latexes (field latexes) taken from rubber-producing plants, and concentrated latexes prepared by centrifugation or creaming (e.g., purified latexes, high-ammonia latexes prepared by adding ammonia in a conventional manner, and LATZ latexes stabilized with zinc oxide, TMTD, and ammonia). Other examples include latexes deproteinized by enzymatic treatment, and latexes saponified with alkalis.

Examples of the rubber-producing plants include plants of the genus *Hevea*, such as *Hevea brasiliensis* (para rubber tree); plants of the genus *Palaquium*, such as *Gutta Percha*; plants of the genus *Taraxacum*, such as *Taraxacum* (dandelion); and plants of the genus *Parthenium*, such as *Parthenium argentatum* (guayule). Preferred among these are plants of the genus *Hevea*, with *Hevea brasiliensis* being more preferred.

The step of centrifuging a natural rubber latex to obtain two or more natural rubber latexes with different natural rubber particle sizes may be carried out using any conventionally known centrifugation process, such as, for example, by three-stage centrifugation at centrifugal forces of 3,000 to 7,000×g, 8,000 to 15,000×g, and 20,000 to 40,000×g. Upper cream fractions (rubber particle layers) separated in the stages may be collected and altogether dispersed in distilled water and a surfactant to prepare a natural rubber latex containing larger size natural rubber particles. Moreover, lower serum fractions separated in the first and second stages may each be subjected to the next stage of centrifugation, and a lower serum fraction separated in the third stage may be used as a natural rubber latex containing smaller size natural rubber particles. The conditions of the centrifugation such as time and temperature may be appropriately selected.

The step of mixing the two or more natural rubber latexes in an appropriate ratio may be carried out by any method, such as, for example, by mixing the natural rubber latex containing larger size natural rubber particles and the natural rubber latex containing smaller size natural rubber particles in an appropriate ratio.

The step of coagulating the natural rubber latex mixture may be carried out by any conventionally known method, such as by adding an acid such as formic acid, acetic acid, or sulfuric acid to the natural rubber latex mixture to adjust the pH.

[Rubber Composition]

The rubber composition of the invention contains a predetermined amount of any of the above-described natural rubbers.

The amount of the natural rubber based on 100% by mass of the rubber component in the rubber composition of the invention is 10% by mass or more, preferably 40% by mass or more, more preferably 70% by mass or more. An amount of less than 10% by mass may fail to achieve the effects of the invention. Moreover, the upper limit of the amount is preferably, but not limited to, 90% by mass or less.

The rubber component of the rubber composition of the invention may include rubbers other than the above-described natural rubbers. Examples include natural rubbers (NR) other than the above-described natural rubbers, polyisoprene rubbers (IR), polybutadiene rubbers (BR), styrene-butadiene rubbers (SBR), styrene-isoprene-butadiene rubbers (SIBR), ethylene-propylene-diene rubbers (EPDM), chloroprene rubbers (CR), and acrylonitrile butadiene rubbers (NBR). These rubbers may be used alone, or two or more of these may be used in combination. Preferred among these is BR because it provides better abrasion resistance.

Non-limiting examples of the BR include high-cis content BR such as BR1220 available from Zeon Corporation, and BR130B and BR150B both available from Ube Industries, Ltd. These types of BR may be used alone, or two or more of these may be used in combination.

The amount of the BR based on 100% by mass of the rubber component in the rubber composition of the invention is preferably 5% by mass or more, more preferably 10% by mass or more. The amount is also preferably 90% by mass or less, more preferably 60% by mass or less, still more preferably 30% by mass or less. When the amount falls within the range indicated above, the effects of the invention can be better achieved.

The rubber composition of the invention preferably contains carbon black.

Examples of the carbon black include, but are not limited to, GPF, FEF, HAF, ISAF, and SAF. The incorporation of carbon black further enhances reinforcing properties.

The carbon black preferably has a nitrogen adsorption specific surface area ($N_2SA$) of 20 $m^2/g$ or greater, more preferably 35 $m^2/g$ or greater, still more preferably 70 $m^2/g$, particularly preferably 100 $m^2/g$ or greater. A $N_2SA$ of less than 20 $m^2/g$ may not provide sufficient reinforcing properties. The nitrogen adsorption specific surface area of the carbon black is also preferably 200 $m^2/g$ or less, more preferably 150 $m^2/g$ or less, still more preferably 130 $m^2/g$ or less. Carbon black having a $N_2SA$ of more than 200 $m^2/g$ tends to be difficult to disperse well.

The nitrogen adsorption specific surface area of the carbon black is determined by the A method in accordance with JIS K 6217.

The amount of the carbon black, if present, per 100 parts by mass of the rubber component in the rubber composition of the invention is preferably 5 parts by mass or more, more preferably 15 parts by mass or more, still more preferably 30 parts by mass or more, particularly preferably 40 parts by mass or more. An amount of less than 5 parts by mass may not sufficiently improve reinforcing properties. The amount is also preferably 100 parts by mass or less, more preferably 60 parts by mass or less. When the amount is more than 100 parts by mass, it tends to be difficult to disperse the carbon black well. Additionally, processability tends to decrease.

The rubber composition of the invention may appropriately contain, in addition to the above materials, materials usually used in the tire industry such as silica, silane coupling agents, zinc oxide, stearic acid, antioxidants, sulfur, and vulcanization accelerators.

The rubber composition of the invention may be prepared by conventional methods. For example, it may be prepared by kneading the components using a rubber kneading machine such as an open roll mill, Banbury mixer, or internal mixer, and then vulcanizing the kneaded mixture. The rubber composition may be used in various tire components, and it is especially suitable for treads.

[Pneumatic Tire]

The pneumatic tire of the invention may be produced using the rubber composition by usual methods. Specifically, the unvulcanized rubber composition containing materials as needed may be extruded and processed into the shape of a tire component such as a tread and formed in a usual manner on a tire building machine to build an unvulcanized tire, which may then be heated and pressurized in a vulcanizer to produce a pneumatic tire of the invention.

The pneumatic tire of the invention is suitable as a tire for passenger vehicles, trucks and buses, two-wheeled vehicles, racing vehicles, or other vehicles, and especially as a tire for trucks and buses.

EXAMPLES

The invention is specifically described with reference to examples, but is not limited thereto.

<Preparation of Natural Rubber>

A field latex (available from Thai Eastern Group) was centrifuged at 5,000×g for 30 minutes. An upper cream fraction (rubber particle layer) 1 was dispersed in distilled water containing a surfactant (Emal-E available from Kao Corporation) to give a latex 1. A lower serum fraction 1 was collected and centrifuged at 10,000×g for one hour, and then an upper cream fraction (rubber particle layer) 2 was dispersed again in the latex 1 resulting from the previous dispersion to give a latex 2. Similarly, a lower serum fraction 2 was collected and centrifuged at 30,000×g for two hours, and then an upper cream fraction (rubber particle layer) 3 was dispersed again in the latex 2 resulting from the previous dispersion to give a natural rubber latex A (solid concentration: about 30%). Moreover, a lower serum fraction 3 was used as a natural rubber latex B (solid concentration: about 10%).

The natural rubber latexes A and B were mixed in the mass ratio indicated in Table 1, and 5% by mass of formic acid was added to the mixture. The serum was squeezed out of the thus coagulated rubber, and the rubber was dried in an oven at 70° C. Thus, solid natural rubbers were prepared.

The natural rubbers were analyzed as described below, and the results are shown in Table 1.

(NMR Analysis)

A solvent for NMR analysis was prepared by adding an antioxidant (N-phenyl-1-naphthylamine) to deuterated chloroform ($CDCl_3$, purity 99.8% or higher, containing 0.03% of tetramethylsilane) at a concentration of 0.1 mg/mL.

Samples for NMR analysis were prepared by dissolving each of the natural rubbers at a concentration of 1 to 20 mg per 0.5 mL of the solvent for NMR analysis in a NMR sample tube.

A NMR spectrometer operating at a $^1H$ resonance frequency of 500 to 950 MHz was used, and $^1H$-NMR analysis was conducted at a temperature of 303 to 313 K with a number of scans of 256 or more.

Chemical shifts were referenced to an internal tetramethylsilane standard (0 ppm).

The natural rubbers were analyzed by solution $^1H$-NMR under such conditions to obtain spectra.

Next, the sum of peak intensities at about 4.17, 3.94, 3.84, 3.73, 3.50, and 3.41 ppm, normalized to 10,000 for the peak intensity at about 5.11 ppm, was determined based on the spectra.

Moreover, the ratio (%) of the sum of peak intensities at about 3.94 and 3.84 ppm to the sum of peak intensities at about 4.17, 3.94, 3.84, 3.73, 3.50, and 3.41 ppm (i.e., the ratio (mol %) of the amount of a structural unit of formula (c) to the combined amount of structural units of formulas (a) to (d)) was determined.

(GPC Measurement)

The weight average molecular weight (Mw) of the natural rubbers was determined by gel permeation chromatography (GPC) under the following conditions (1) to (7).

(1) Apparatus: HLC-8220 available from Tosoh Corporation
(2) Separation column: HM-H available from Tosoh Corporation, three columns in series
(3) Measurement temperature: 40° C.
(4) Carrier: tetrahydrofuran
(5) Flow rate: 0.6 mL/minute
(6) Injection amount: 5 μL
(7) Detector: differential refractometer

TABLE 1

|  | Natural rubber 1 | Natural rubber 2 | Natural rubber 3 (TSR20) |
|---|---|---|---|
| Mixing ratio (mass ratio) of natural rubber latex A to B | 40/60 | 30/70 | — |
| Sum of peak intensities at about 4.17, 3.94, 3.84, 3.73, 3.50, and 3.41 ppm | 7.8 | 6.6 | 14.5 |
| Ratio (%) of peak intensities at about 3.94 and 3.84 ppm (ratio (mol %) of amount of structural unit of formula (c)) | 51 | 48 | 42 |
| Mw | $1.53 \times 10^6$ | $1.67 \times 10^6$ | $8.5 \times 10^5$ |

The chemicals used in the preparation of unvulcanized rubber compositions and vulcanized rubber compositions are listed below.

Natural rubbers 1 and 2: The natural rubbers prepared by the above methods

Natural rubber 3: TSR20
Polybutadiene rubber: BR150B available from Ube Industries, Ltd.
Carbon black: SHOBLACK N220 ($N_2SA$: 111 $m^2/g$, DBP: 115 mL/100 g) available from Cabot Japan K.K.
Antioxidant: NOCRAC 6C (N-phenyl-N'-(1,3-dimethylbutyl)-p-phenylenediamine) available from Ouchi Shinko Chemical Industrial Co., Ltd.
Stearic acid: A product available from NOF Corporation
Zinc oxide: Zinc oxide #1 available from Mitsui Mining and Smelting Co., Ltd.
Sulfur: Powdered sulfur available from Tsurumi Chemical Industry Co., Ltd.
Vulcanization accelerator: Nocceler NS (N-tert-butyl-2-benzothiazylsulfenamide) available from Ouchi Shinko Chemical Industrial Co., Ltd.

<Preparation of Unvulcanized Rubber Composition and Vulcanized Rubber Composition>

According to the formulations shown in Table 2, the chemicals other than the sulfur and vulcanization accelerator were kneaded using a 250-cc Banbury mixer. The sulfur and vulcanization accelerator were kneaded with the kneaded mixture using a roll to give an unvulcanized rubber composition. The unvulcanized rubber composition was pressed at 150° C. for 30 minutes using a 2-mm thick mold to give a vulcanized rubber composition.

The unvulcanized rubber compositions and vulcanized rubber compositions prepared as above were evaluated as follows.

Table 2 shows the results.

(Processability)

The Mooney viscosity of the given unvulcanized rubber compositions was measured at 130° C. in accordance with JIS K 6300. The results are expressed as an index (processability index), with Comparative Example 1 set equal to 100. A higher index indicates a lower viscosity and easier and better processability.

(Abrasion Resistance)

The abrasion loss of test pieces (vulcanized rubber compositions) was determined using a Lambourn abrasion tester (Iwamoto Seisakusho Co., Ltd.) at a surface rotational speed of 50 m/min, an applied load of 3.0 kg, a sand feed rate of 15 g/min, and a slip ratio of 20%. The values are expressed as an index (abrasion resistance index), with Comparative Example 1 set equal to 100. A higher index indicates better abrasion resistance.

TABLE 2

|  |  | Example 1 | Example 2 | Example 3 | Example 4 | Comparative Example 1 |
|---|---|---|---|---|---|---|
| Formulation (parts by mass) | Natural rubber 1 | 80 | — | 30 | 60 | — |
|  | Natural rubber 2 | — | 80 | — | — | — |
|  | Natural rubber 3 | — | — | 50 | 20 | 80 |
|  | Polybutadiene rubber | 20 | 20 | 20 | 20 | 20 |
|  | Carbon black | 50 | 50 | 50 | 50 | 50 |
|  | Antioxidant | 1.5 | 1.5 | 1.5 | 1.5 | 1.5 |
|  | Stearic acid | 2 | 2 | 2 | 2 | 2 |
|  | Zinc oxide | 3 | 3 | 3 | 3 | 3 |
|  | Sulfur | 1 | 1 | 1 | 1 | 1 |
|  | Vulcanization accelerator | 1.5 | 1.5 | 1.5 | 1.5 | 1.5 |
| Evaluation | Processability index | 112 | 107 | 104 | 110 | 100 |
|  | Abrasion resistance index | 121 | 124 | 116 | 120 | 100 |

Table 2 demonstrates that abrasion resistance was improved in the examples using a natural rubber which showed a $^1$H-NMR spectrum where the sum of peak intensities at about 4.17, 3.94, 3.84, 3.73, 3.50, and 3.41 ppm, normalized to 10,000 for the peak intensity at about 5.11 ppm, was 8.0 or less.

It is also demonstrated that processability was improved in the examples using a natural rubber which showed a $^1$H-NMR spectrum where the ratio of the sum of peak intensities at about 3.94 and 3.84 ppm to the sum of peak intensities at about 4.17, 3.94, 3.84, 3.73, 3.50, and 3.41 ppm was 45% or more, and had a ratio of the amount of a structural unit of formula (c) to the combined amount of structural units of formulas (a) to (d) of 45 mol % or more.

The invention claimed is:

1. A modified natural rubber, which shows a $^1$H-NMR spectrum where a sum of peak intensities at about 4.17, 3.94, 3.84, 3.73, 3.50, and 3.41 ppm, normalized to 10,000 for a peak intensity at about 5.11 ppm, is 8.0 or less.

2. The modified natural rubber according to claim 1, wherein the natural rubber has a weight average molecular weight of $6.0 \times 10^5$ or greater.

3. A rubber composition, comprising, based on 100% by mass of a rubber component therein, 10% by mass or more of the modified natural rubber according to claim 1.

4. A pneumatic tire, formed from the rubber composition according to claim 3.

5. A modified natural rubber, which shows a $^1$H-NMR spectrum where a ratio of a sum of peak intensities at about 3.94 and 3.84 ppm to a sum of peak intensities at about 4.17, 3.94, 3.84, 3.73, 3.50, and 3.41 ppm is 45% or more.

6. A modified natural rubber, having a ratio of an amount of a structural unit represented by the following formula (c) to a combined amount of structural units represented by the following formulas (a) to (d) of 45 mol % or more:

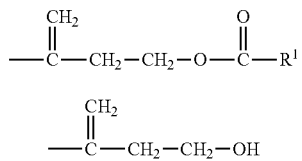
(a)

(b)

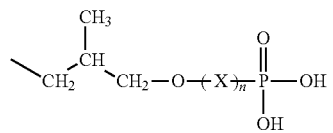
(c)

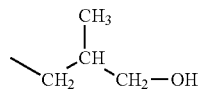
(d)

wherein $R^1$ represents a branched or unbranched C1-C30 alkyl group or a branched or unbranched C2-C30 alkenyl group; and n represents 0 or 1, and X represents a divalent group.

* * * * *